United States Patent
Mall, Jr.

(10) Patent No.: US 12,466,450 B2
(45) Date of Patent: Nov. 11, 2025

(54) SYSTEMS AND METHODS FOR INSPECTION OF A TRACK OF AN AMUSEMENT ATTRACTION

(71) Applicant: Universal City Studios LLC, Universal City, CA (US)

(72) Inventor: Howard Bruce Mall, Jr., Winter Springs, FL (US)

(73) Assignee: Universal City Studios LLC, Universal City, CA (US)

( * ) Notice: Subject to any disclaimer, the term of this patent is extended or adjusted under 35 U.S.C. 154(b) by 113 days.

(21) Appl. No.: 18/244,751

(22) Filed: Sep. 11, 2023

(65) Prior Publication Data
US 2024/0083475 A1 Mar. 14, 2024

Related U.S. Application Data

(60) Provisional application No. 63/406,126, filed on Sep. 13, 2022.

(51) Int. Cl.
  *B61L 23/04* (2006.01)
  *A63G 7/00* (2006.01)
  *B61K 3/02* (2006.01)
  *B61K 9/08* (2006.01)

(52) U.S. Cl.
  CPC .............. *B61K 9/08* (2013.01); *A63G 7/00* (2013.01); *B61K 3/02* (2013.01)

(58) Field of Classification Search
  CPC .. B60F 2301/04; B60F 2301/10; B60F 1/005; B61K 9/08; B61K 3/02; A63G 7/00
  See application file for complete search history.

(56) References Cited

U.S. PATENT DOCUMENTS

| | | |
|---|---|---|
| 9,079,109 B2 * | 7/2015 | Buhler ................. B60W 30/16 |
| 9,433,870 B2 | 9/2016 | Blum et al. |
| 9,690,375 B2 | 6/2017 | Blum et al. |
| 10,304,234 B2 | 5/2019 | Hellam et al. |
| 11,207,952 B1 | 12/2021 | Bonilla Acevedo et al. |
| 11,420,491 B2 * | 8/2022 | Sirault ................. A01B 73/02 |
| 11,673,590 B2 * | 6/2023 | Hydro ................. H04N 23/57 |
| | | 104/53 |
| 2009/0025598 A1 | 1/2009 | Menser, Jr. et al. |
| 2010/0224098 A1 * | 9/2010 | Gordon ................. A63G 7/00 |
| | | 104/53 |
| 2020/0390328 A1 | 12/2020 | Toth et al. |

(Continued)

FOREIGN PATENT DOCUMENTS

DE 10252164 A1 5/2004

OTHER PUBLICATIONS

PCT/US2023/032557 International Search Report and Written Opinion mailed Dec. 8, 2023.

(Continued)

*Primary Examiner* — Gonzalo Laguarda
(74) *Attorney, Agent, or Firm* — Fletcher Yoder, P.C.

(57) ABSTRACT

An attraction system includes a track, a support vehicle having a wheel assembly configured to adjustably engage the track and having a sensor configured to capture a characteristic of the attraction system. In addition, the attraction system comprises a control assembly configured to control the support vehicle to traverse the track via the wheel assembly and receive, from the sensor, sensor data indicative of the characteristic of the attraction system.

20 Claims, 4 Drawing Sheets

(56) References Cited

U.S. PATENT DOCUMENTS

2022/0129649 A1   4/2022  Friedberger et al.
2024/0253676 A1*  8/2024  Kieser ................. G01N 29/225

OTHER PUBLICATIONS

3D Scanning Technology Aids Roller Coaster Maintenance and Accident Prevention. Metrology.News. (Jun. 29, 2018). https:/metrology.news/3d-scanning-technology-aids-roller-coaster-maintenance-and-accident-prevention/.

* cited by examiner

SYSTEMS AND METHODS FOR INSPECTION OF A TRACK OF AN AMUSEMENT ATTRACTION

CROSS-REFERENCE TO RELATED APPLICATION

This application claims priority to and the benefit of U.S. Provisional Application No. 63/406,126, entitled "SYSTEMS AND METHODS FOR INSPECTION OF A TRACK OF AN AMUSEMENT ATTRACTION," filed Sep. 13, 2022, which is incorporated by reference herein in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues have a variety of features to entertain guests. For example, an amusement park may include an attraction system such as a ride (e.g., a roller coaster), a theatrical show, an extended reality system, and so forth. The attraction system may include a ride vehicle that transports guests of the amusement park throughout or within the attraction system, such as along a track, performing various operations that entertain the guests. During a lifetime of the attraction system, traditional monitoring and/or maintenance procedures may be employed to preserve integrity of various structural features of the attraction system. Unfortunately, traditional monitoring and/or maintenance procedures may be expensive and take an excessive amount of time. Accordingly, it is now recognized that improved monitoring and maintenance of attraction systems is desired.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an attraction system comprises a track, a support vehicle having a wheel assembly configured to adjustably engage the track, and having a sensor configured to acquire sensor data indicative of a characteristic of the attraction system. In addition, the attraction system comprises a vehicle controller configured to control the support vehicle to traverse the track via the wheel assembly, receive, from the sensor, the sensor data indicative of the characteristic of the attraction system, and perform an action based on the sensor data.

In an embodiment, a support vehicle comprises a robotic leg assembly coupled to a wheel assembly, wherein the wheel assembly is configured to roll on a track of an attraction system, a robotic arm configured to receive an additional component of the support vehicle, and a modular payload platform coupled to the robotic arm. In addition, the support vehicle comprises a vehicle controller configured to control, based on a size of the track, the robotic leg assembly to cause the wheel assembly to engage the track, control the robotic arm to cause a movement of the additional component relative to the modular payload platform, and control the support vehicle to traverse the track.

In an embodiment, a method comprises, based on dimensions of a track, adjusting a robotic leg assembly of an autonomous support vehicle, a wheel assembly of the autonomous support vehicle, or both, traversing the track via the autonomous support vehicle, receiving sensor data via a sensor of the autonomous support vehicle, and, based on the sensor data, controlling a robotic arm to perform a maintenance operation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to an attraction system of an amusement or theme park. The attraction system may include a roller coaster, a theatrical show, an interactive experience, and so forth. For example, the attraction system may include a ride vehicle configured to receive guests of the attraction system. During operation of the attraction system, the ride vehicle may move along a track (e.g., a rail track) to impart a movement sensation (e.g., a gravitational force, an inertial force, a postural adjustment) on the guests to provide entertainment. Additionally or alternatively, the attraction system may include a variety of show effects, and the ride vehicle may carry the guests to different locations of the attraction system to experience different show effects.

In accordance with the present disclosure, it may be desirable to perform reality capture of the attraction system and/or inspection and maintenance procedures on the attraction system. Reality capture, for example, may refer to digital construction of a virtual representation of the attraction system, such as a three-dimensional virtual representation, based on sensor data, such as imaging data captured by a camera. For example, reality capture of the attraction system from the track may enable guests, inspectors, maintenance personnel, and others to view the various show effects without riding the attraction system, which may aid in creating an increasingly entertaining ride experience. In addition, it may be desirable to perform inspection and/or maintenance of the track and of the attraction system. For example, inspection and maintenance of the track may help maintain the track in a good working condition, reduce vibrations of the track when it is being traversed by the ride vehicle, and increase a lifespan of the attraction system. However, existing approaches for performing inspection, maintenance, and/or reality capture of the track and its surroundings (e.g., portions of the attraction system surrounding the track) are expensive, inefficient, time consuming, complex, and/or difficult.

Thus, it is presently recognized that improving reality capture and/or inspection and maintenance operations of the attraction system may reduce cost and improve efficient operation of the attraction system, relative to traditional approaches. In addition, enabling efficient reality capture of the attraction system from the track may improve, for example, a consistency of features that provide entertainment to the guests that experience the attraction system. Accordingly, embodiments of the present disclosure are directed to a support vehicle designed to autonomously traverse the track of the attraction system and to perform reality capture, inspection, and/or maintenance operations from the track. The support vehicle may include a modular payload platform that may include various sensors and tools. For example, the payload platform of the support vehicle may have a light detection and ranging (LIDAR) sensor and/or a camera system, among other possible features, for performing reality capture or inspection operations. Depending on the operation that the support vehicle is tasked with performing, various sensors and tools may be added to or removed from the modular payload platform and will be described in detail with reference to the drawings.

The support vehicle may traverse the track at a range of different speeds and have the ability to stop or otherwise decelerate on the track (e.g., to perform maintenance operations that may take time, improve data capture of various portions of the attraction system, etc.). The support vehicle may be configurable to accommodate a variety of different track sizes and systems such that it may be used to traverse tracks of different attraction systems. Further, the support vehicle may include a set of legs with each leg having a wheel assembly that may be adjustable to the circumference of the portion (e.g., rail, guide) of the track. The wheel assembly may include grippers that may adjust the friction between the wheels of the wheel assembly and the track to control the speed of the support vehicle and/or to prevent the support vehicle from slipping off the track. In addition, the support vehicle may include a robotic arm that may include any of the sensors or maintenance tools described above and/or additional sensors and maintenance tools for the inspection and/or maintenance of the track, track support structure, or other components of the amusement attraction system (e.g., show effects).

Figure 1:
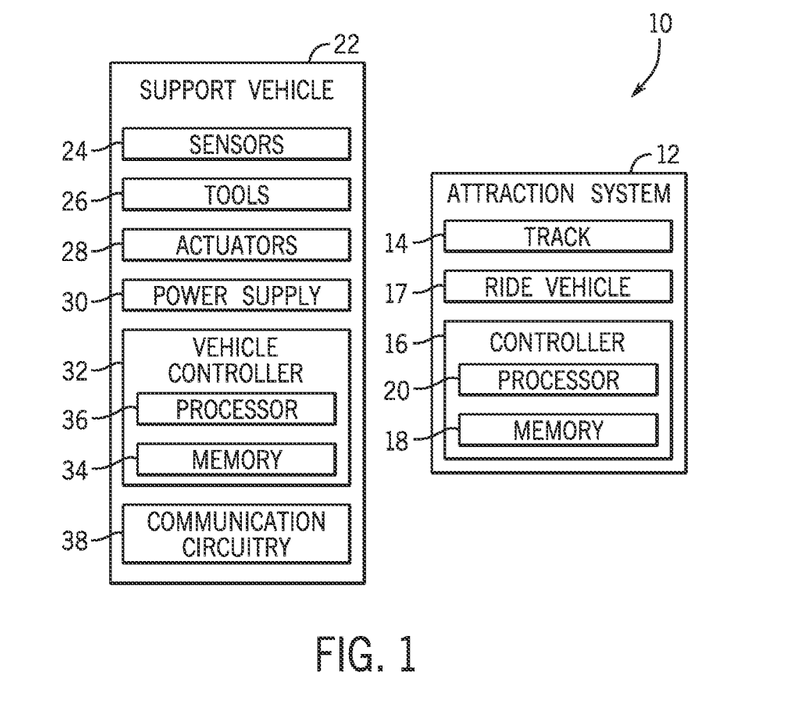
FIG. 1 is a block diagram of a traverser system including a support vehicle and an attraction system, in accordance with an aspect of the present disclosure.

With the preceding in mind, FIG. 1 is a block diagram of a traverser system 10 that includes a support vehicle 22 and an attraction system 12. The attraction system 12 (e.g., a roller coaster, an amusement ride, an interactive show, an immersive experience, etc.) may include a track 14 and a controller 16, and may be operable to entertain one or more guests. As discussed, the track 14 (e.g., ride track, roller coaster track, rail, guide) may support a ride vehicle 17 carrying passengers (e.g., guests of the amusement park) though the attraction system 12. It should be noted that the ride vehicle 17 may be separate from or attached with the support vehicle 22. During the entertainment operation of the attraction system, the controller 16 may output instructions to adjust the path of the track 14 (e.g., if track 14 has two ride paths, the controller 16 may direct the ride vehicle 17 to one of the paths), drive the movement of the ride vehicle 17 along the track 14, and/or enable show effects to entertain guests. The controller 16 may include a memory 18 and processor 20. The memory 18 may include volatile memory, such as random access memory (RAM), and/or non-volatile memory, such as read-only memory (ROM), optical drives, hard disc drives, solid-state drives, or any other non-transitory computer-readable medium that includes instructions. The processor 20 may be operable to execute such instructions. For example, the processor 20 may include one or more application specific integrated circuits (ASICs), one or more field programmable gate arrays (FPGAs), one or more general purpose processors, or any combination thereof. It should be noted that the controller 16, the memory 18, and the processor 20 may each represent multiple such features that can operate together or separately. For example, the controller 16 may represent one or more controllers, the memory 18 may represent one or more memories, and the processor 20 may represent one or more processors.

The support vehicle 22 of the traverser system 10 may be configured to engage and traverse the track 14 of the attraction system 12 and to perform reality capture, inspection, and/or maintenance operations on the attraction system 12. The support vehicle 22 may include sensors 24 that enable the support vehicle 22 to perform reality capture, inspection and/or maintenance operations. The sensors 24 may include cameras and/or LIDAR sensors that may capture a view of the attraction system 12 from the perspective of the passengers inside the ride vehicle 17 or from other perspectives. The captured data may then be analyzed (e.g., onboard the support vehicle 22 or externally) to construct a comprehensive three-dimensional view (e.g., via photogrammetry) of the attraction system 12 (e.g., as seen by the passengers), which may be used to improve the attraction system 12. For example, data collected from the sensors 24 may indicate that a particular show effect of the attraction system 12 is not clearly visible to the passengers in the ride vehicle 17 due to the view being obstructed by a part of the track 14 or due to the show effect being positioned not in the direct line-of-sight of the passengers. In this case, the position of the show effect and/or the path of the track 14 may be adjusted to make the show element more visible to the passengers.

In an embodiment, the sensors 24 may include radio frequency identification (RFID) detectors that may allow the support vehicle 22 to perform track inspection. For example, the track 14 (or componentry disposed on or adjacent to the track 14) may be configured to emit certain signals (e.g., RFID signals) if the track 14 is in good working condition. For example, RFID antenna may be stimulated by a feature of the support vehicle 22 (e.g., an emitter of the sensors 24) to emit a signal. However, if at least a portion of the track 14 (or componentry disposed on or adjacent to the track 14) is misconfigured (e.g., due to damaged parts, loosened bolts), the above-described signals may be blocked (e.g., a damaged RFID antenna may not be capable of being stimulated to send a signal). As the support vehicle 22 is traversing the track 14, the sensors 24 (e.g., RFID detectors) may receive such signals. If the signal is not received, a close inspection of a portion of the track 14 where the signal is not received may be triggered. In addition, a notification may be sent to the controller 16 indicating that the attraction system 12 may not be suitable for entertainment operations or that maintenance may be due now or in the near future. It may be appreciated that additional types of sensors 24 that are not mentioned herein may be incorporated onboard the support vehicle 22 (e.g., temperature sensor, Hall effect sensor, proximity sensor, light sensor, ultrasonic sensor, etc.). Further, the sensors 24 may include RFID reader and/or RFID writers that stimulate RFID antennas or tags.

The support vehicle 22 may also include tools 26 for the maintenance of the track 14. In an embodiment, the tools 26 may include a robotic arm (illustrated in later figures) that may perform maintenance of the track 14 and/or of portions of the attraction system 12 surrounding the track 14. For example, the robotic arm may include a screwdriver or a wrench for tightening screws or bolts, in addition to actuators (e.g., electronically automated actuators) employed to actuate the screwdriver or wrench. In another example, the robotic arm may include a camera for close inspection of specific portions of the track 14 and/or specific portions of the attraction system 12. In an embodiment, data feedback from the camera may be used to control the robotic arm. It may be appreciated that a robotic arm may reach parts of the track 14 and/or parts of the attraction system 12 that may be difficult to reach through other means.

The support vehicle 22 may include actuators 28 that may enable legs of the vehicle to move, adjust configuration, and grip the track 14 via a pair of grippers. For example, the actuators 28 may enable the legs of the support vehicle 22 to adjust configuration to fit various track dimensions (e.g., adjusting to fit track width, diameter of the track rails, number of track rails). In this way, the support vehicle 22 may be configured to move along multiple tracks corresponding to multiple attraction systems. In addition, the actuators 28 may enable the grippers, which are attached to wheels, to loosen or tighten, thus increasing or decreasing the friction of wheels of the support vehicle 22 with rails of the track 14 and thereby controlling the speed of the support vehicle 22. In an embodiment, the actuators 28 may enable the movement of the robotic arm of the support vehicle 22. For example, the actuators 28 may enable the robotic arm to extend, bend, and to reach parts of the track 14 and the attraction system 12 that need maintenance.

In an embodiment, the support vehicle 22 may include one or more motors 29 (e.g., electric motors) that may enable translational movement of the support vehicle 22 (e.g., along the track 14). For example, the motors 29 may drive the rotation of the wheels of the support vehicle 22. In particular, one or more of the motors 29 may drive one or more wheels via a belt or a chain. Additionally or alternatively, the motors 29 may be hub-mounted motors (e.g., in-wheel motors) that drive the wheels though direct contact. In an additional or alternative embodiment, the motors 29 may perform similar functions as the actuators 28 driving the movement (e.g., bending, extension) of the robotic legs and the robotic arm of the support vehicle 22.

The support vehicle 22 may be powered by a power supply 30, such as a source of stored power (e.g., battery), harvested power (e.g., solar energy, electrical power generated via kinetic energy, wind energy), and/or any other power source that is integral to or a part of (e.g., enclosed within) the support vehicle 22. The power supply 30 may enable operation of various components of the support vehicle 22, such as enabling operation of the actuators 28 and the motors 29. Indeed, using the power provided by the power supply 30, the support vehicle 22 may be able to perform the reality capture, inspection, and maintenance operations without receiving power from an external power source or a power source that is separate from (e.g., not coupled to) the support vehicle 22. In an additional or alternative embodiment, the support vehicle 22 may be configured to receive power from an external power source, such as grid power, a generator, an external battery, and so forth, in order to perform the reality capture, inspection, and/or maintenance operation.

In an embodiment, the support vehicle 22 may perform reality capture, inspection, and/or maintenance operations autonomously, operating via instructions from a vehicle controller 32 onboard the support vehicle 22. The vehicle controller 32 (e.g., one or more automation controller, programmable controller, electronic controller) of the support vehicle 22 may be communicatively coupled to the sensors 24, actuators 28, motors 29, power supply 30, communication circuitry 38, and tools 26 of the support vehicle 22. The vehicle controller 32 may include a memory 34 and processor 36. The memory 34 may include volatile memory, such as random access memory (RAM), and/or non-volatile memory, such as read-only memory (ROM), optical drives, hard disc drives, solid-state drives, or any other non-transitory computer-readable medium that includes instructions for traversing the track 14, executing reality capture, inspection, and/or maintenance operations, etc. The processor 36 may be operable to execute such instructions. For example, the processor 36 may include one or more application-specific integrated circuits (ASICs), one or more field programmable gate arrays (FPGAs), one or more general purpose processors, or any combination thereof. In an additional or an alternative embodiment, the support vehicle 22 may be remote controlled to perform reality capture, inspection and maintenance operations, operating via instructions received via communication circuitry 38 from an external controller. It should be noted that the vehicle controller 32, the memory 34, and the processor 36 may each represent multiple such features that can operate together or separately. For example, the vehicle controller 32 may represent one or more controllers, the memory 34 may represent one or more memories, and the processor 36 may represent one or more processors.

The communication circuitry 38 of the support vehicle 22 may include a receiver, a transmitter, and/or other communications devices to communicate over wired and wireless communication paths. For example, the communication circuitry 38 may be utilized to send the collected reality capture and/or inspection data to an external controller for analysis. In another example, the communication circuitry 38 may be utilized to receive data about the current weather conditions (e.g., if the support vehicle 22 is operating outside), which may be used to determine whether the support vehicle 22 should stop operating on the track 14 (e.g., due to unfavorable weather conditions, rain). In an embodiment, the communication circuitry 38 may be used to send a notification indicating a condition of the track 14 to an external controller such as a mobile device. For example, if the support vehicle 22 identifies an issue with the track 14 (e.g., loosened bolts), for example, during the inspection operation, the support vehicle 22 may send, via the communication circuitry 38, a notification to the operator of the attraction system 12 indicating that the track 14 is not ready for entertainment operations. In one embodiment, the notification may be transmitted from the communication circuitry 38 of the support vehicle 22 to the controller 16 of the attraction system 12.

It should be appreciated that the support vehicle 22 is different from the ride vehicle 17. While the ride vehicle 17 may transport passengers and perform entertainment operations, the support vehicle 22 may transport tools 26 and sensors 24 and may perform reality capture, inspection and/or maintenance operations. The support vehicle 22 may generally be lighter (e.g., weigh less) and smaller than the ride vehicle 17. However, in some embodiments, the support vehicle 22 can be attached to the ride vehicle 17.

Figure 2:
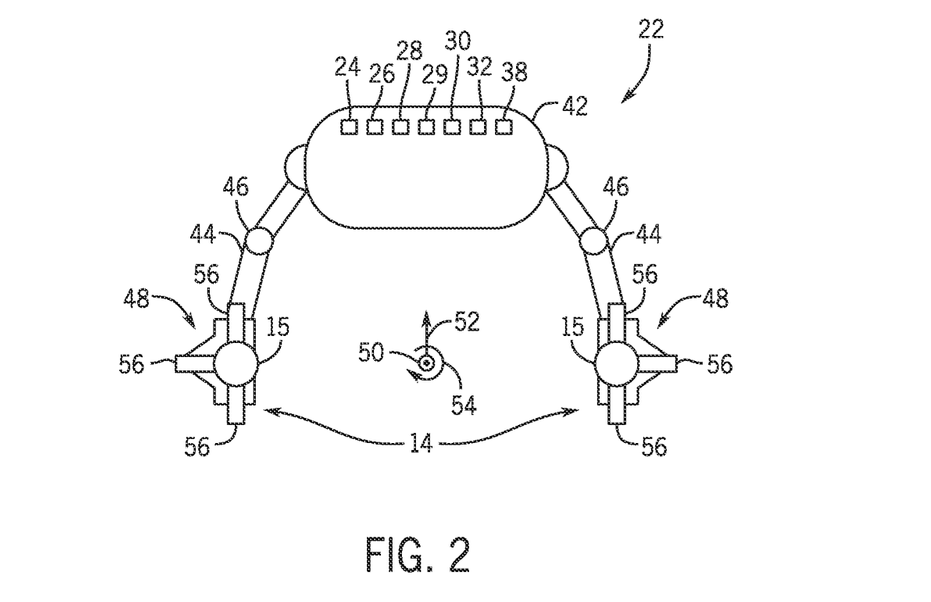
FIG. 2 is a schematic front view of an embodiment of the support vehicle of FIG. 1, in accordance with an aspect of the present disclosure.

FIG. 2 is a schematic front view of an embodiment of the support vehicle 22 of FIG. 1. The support vehicle 22 may include a body 42 and one or more legs 44 (referred to below as "robotic legs 44"). The body 42 of the support vehicle 22 may include (e.g., hold, house) the vehicle controller 32, the sensors 24, the communication circuitry 38, the tools 26, and the power supply 30 of the support vehicle 22. In an embodiment, the body 42 may include input/output ports for connecting (e.g., communicatively coupling) sensors 24 and/or tools 26 to the support vehicle 22. In addition, the body 42 may include components (e.g., fasteners, magnets, mounting plates) for physically connecting the sensors 24 and/or the tools 26 to the support vehicle 22.

The robotic legs 44 of the support vehicle 22 may be configured to couple (e.g., mechanically, magnetically) with track rails 15 (e.g., guides, beams) of the track 14 of FIG. 1 via the wheel assembly 48 (e.g., three-axial wheel assembly). The robotic legs 44 may include one or more joints 46 that enable the robotic legs 44 to bend, allowing for the support vehicle 22 to couple with track rails 15 of various sizes and configurations and maneuver to various positions for purposes of maintenance or reality capture of various componentry. For example, a support vehicle 22 may receive (e.g., from an external controller) dimension data for a particular track 14 and adjust the configuration of its robotic legs 44 to fit the dimensions of the track 14 (e.g., track rail diameter, distance between the track rails 15). Additionally, or alternatively, the support vehicle 22 may determine the dimensions of the track 14 based on sensor data and adjust the configuration of the robotic legs 44 according to the dimensions. In such scenarios, the configuration of the robotic legs 44 may remain the same (e.g., no movement in the one or more joints 46) for the duration of the operation on the track 14. However, it may also be possible for the robotic legs 44 of the support vehicle 22 to change configuration while the support vehicle 22 is performing operations on the track 14. For example, the robotic legs 44 of the support vehicle 22 may robotically bend and/or extend or retract to provide an onboard camera with a better or different view, or to ensure stability of the support vehicle 22 while the support vehicle 22 is traversing the track 14.

The support vehicle 22 may include a wheel assembly 48 (e.g., three-axis wheel assembly) at the end portions of each of the robotic legs 44. To facilitate discussion, the wheel assembly 48 may be described below with reference to a coordinate system (e.g., centered on the track 14) having an axial axis 50 (e.g., an axis along direction of travel), a lateral axis 52, and/or a circumferential axis 54. In an embodiment, each wheel assembly 48 may include two or more wheels 56 (e.g., three wheels 56) distributed along the circumferential axis 54 and around the track rail 15 so as to contact the track rail 15 from different directions. For example, one of the wheels 56 of the wheel assembly 48 may contact the track rail 15 from the top, another wheel assembly 48 may contact the track rail 15 from the bottom, and still another of the wheels 56 may contact the track rail 15 from the side relative to the position of the support vehicle 22, as shown in FIG. 2. Such a wheel assembly 48 may allow the support vehicle 22 to traverse the track 14 at various orientations relative to the ground without falling off the track 14.

Figure 3:
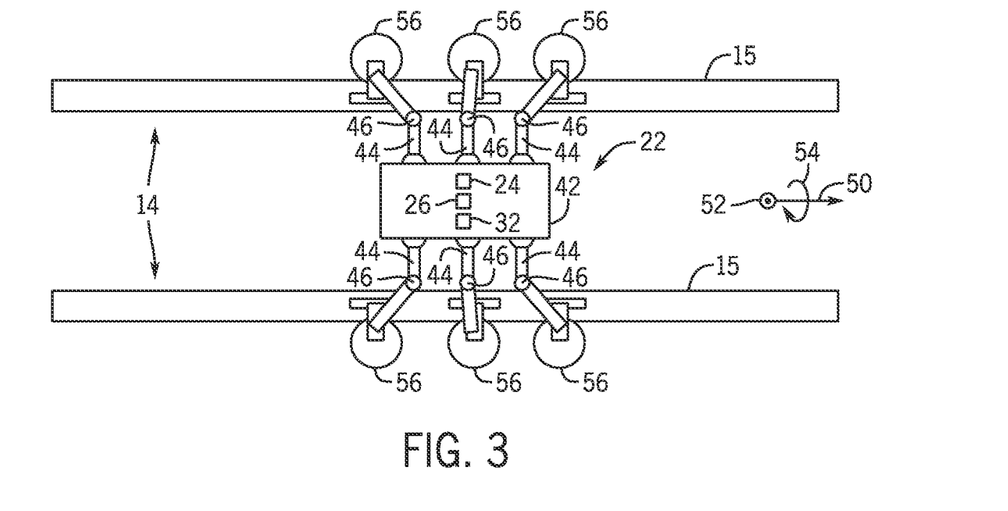
FIG. 3 is a schematic top view of an embodiment of the support vehicle of FIG. 1, in accordance with an aspect of the present disclosure.

FIG. 3 is a schematic top view of an embodiment of the support vehicle 22 of FIG. 1. In the illustrated embodiment, the support vehicle 22 includes six robotic legs 44, three on each side. Generally, the support vehicle 22 may have any number of the robotic legs 44. The number of robotic legs 44 of the support vehicle 22 may depend on track configuration (e.g., steepness of the track 14, twisting of the track 14, radius of the turns and/or loops in the track 14) and the type of operations that the support vehicle 22 may perform. For example, if the track 14 is relatively flat (e.g., level, having a uniform gravitational force), four robotic legs 44 may be sufficient to keep the support vehicle 22 balanced and stable when traversing the track 14. However, if the track 14 has twists and/or loops, more than four robotic legs 44 may be necessary to keep the support vehicle 22 stable. Each of the robotic legs 44 may be individually actuatable to improve flexibility of the support vehicle 22 relative to the track 14, such as around twists, turns, curves, and/or loops formed in the track 14. In addition, more or fewer robotic legs 44 may be needed depending on the tools 26 and/or sensors 24 present onboard the support vehicle 22. For example, if the support vehicle 22 includes a robotic arm, which may be relatively heavy compared to the rest of the support vehicle 22, the support vehicle 22 may include more robotic legs 44 to support the weight of the robotic arm. In an embodiment, having multiple robotic legs 44 may allow the support vehicle 22 to traverse the track 14 and/or the ground by stepping via the robotic legs 44 rather than rolling via the wheels 56. In an additional or an alternative embodiment, including several robotic legs 44 may enable the support vehicle 22 to autonomously transition from traversing on the ground to traversing on the track 14 by robotically stepping onto the track 14 (e.g., from the ground or a platform).

Figure 4:
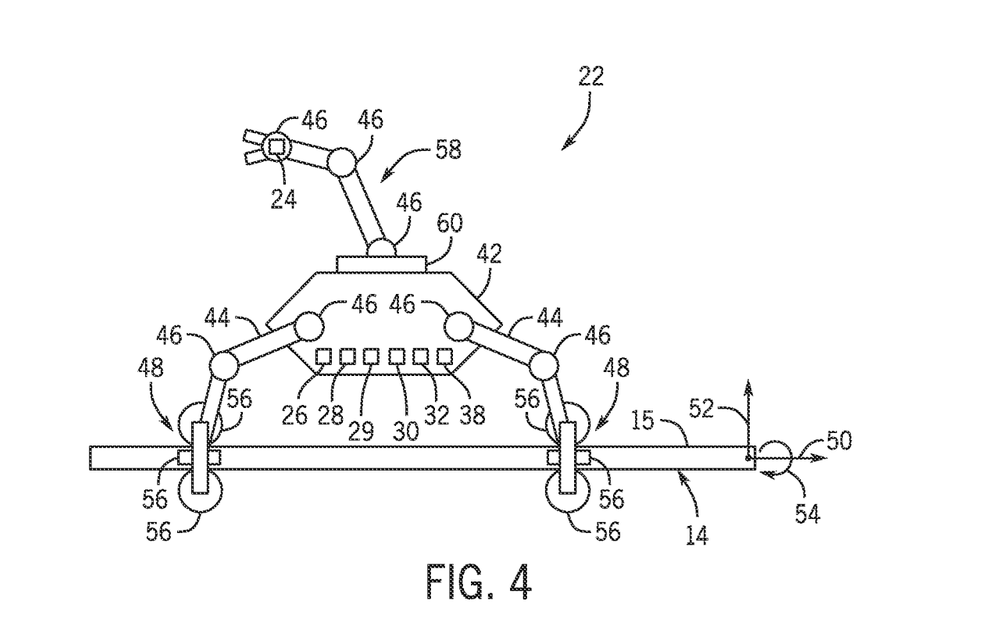
FIG. 4 is a schematic side view of an embodiment of the support vehicle of FIG. 1, including a robotic arm, in accordance with an aspect of the present disclosure.

FIG. 4 is a schematic side view of the support vehicle 22 including a robotic arm 58. In an embodiment, the robotic arm 58 may be mounted onto a modular payload platform 60 that may additionally hold other tools 26 and/or sensors 24.

The modular payload platform 60 may include input/output ports for connecting (e.g., communicatively coupling) the robotic arm 58 and/or sensors 24 mounted onto robotic arm 58 to the vehicle controller 32. In addition, the modular payload platform may include components (e.g., fasteners, magnets, mounting plates) for physically connecting and securing the robotic arm 58. The robotic arm 58 may include one or more joints 46 that may allow it to bend. The robotic arm 58 may also include portions that may allow it to extend or retract. The actuators 28 and/or the motors 29 may drive the movement, bending and extension or retraction of the robotic arm 58. In an additional or alternative embodiment, the robotic arm 58 may be coupled to the support vehicle 22 directly rather than to the modular payload platform 60. It should be appreciated that the support vehicle 22 may have other types of robotic components and/or several robotic arms 58.

In an embodiment, the sensors 24 may be mounted onto the robotic arm 58 for close inspection operations. For example, the robotic arm 58 may move a camera, which is located at the end portion of the robotic arm 58, to a particular area of the track 14 such that the camera may capture a close-up image of the area. This may be advantageous if the track 14 contains small/fine features (e.g., a bolts, cracks, chipped coating). In an embodiment, the camera may capture images of bolts on the structure of the track 14, which may be analyzed (e.g., via artificial intelligence algorithm) to determine whether the bolt is loose (e.g., due to torque stripe and/or seal being broken).

In an embodiment, the robotic arm 58 may include tools 26 for performing maintenance. For example, the robotic arm 58 may have a socket or a torque wrench mounted at its end portion. If the inspection operation determines that a bolt is loose on the track 14, the robotic arm 58 may use the socket or the wrench to tighten the bolt to a desired torque. In particular, the robotic arm 58 may include sensors 24 such as a torque sensor that may enable control of the socket or the wrench to impart the desired torque to the bolt. The robotic arm 58 may also include application tools, such as a brush or a roller, for applying torque stripes to tightened fasteners (e.g., bolts) on the track and/or for reapplying paint, lubricant, protective coating to the track 14. Additionally, the robotic arm 58 may include tools for performing maintenance functions such as cleaning the track 14 and/or removing debris from the track 14.

Figure 5:
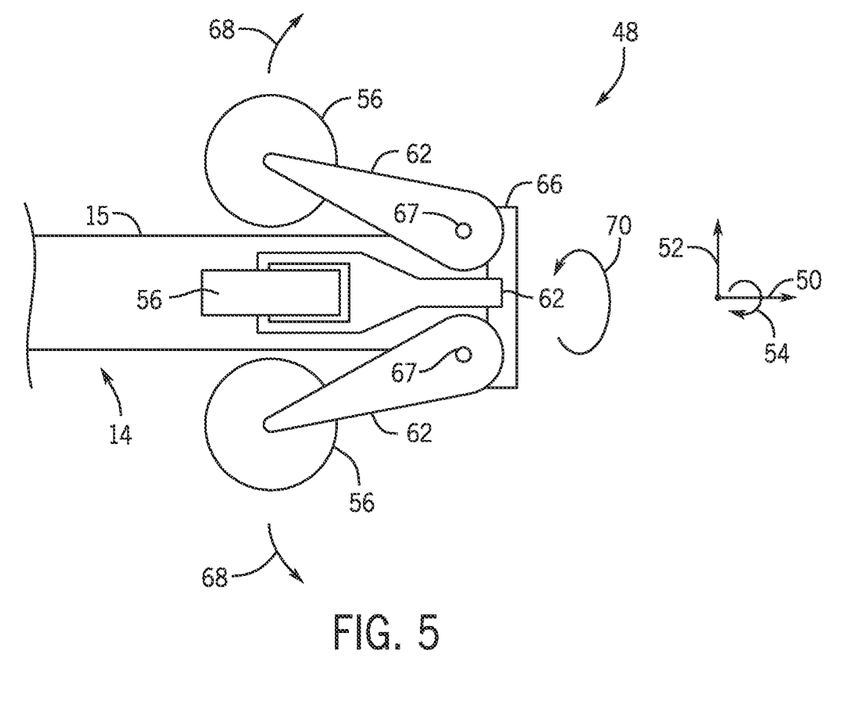
FIG. 5 is a schematic side view of an embodiment of a wheel assembly (e.g., of the support vehicle of FIG. 1) placed on a track rail (e.g., of the attraction system of FIG. 1), in accordance with an aspect of the present disclosure.

FIG. 5 is a schematic diagram of a side view of an embodiment of the wheel assembly 48 of the support vehicle 22 of FIG. 1, where the wheel assembly 48 is placed on the track rail 15. As shown in FIG. 5, the grippers 62 may attach to the wheels 56 at one end (e.g., distal end) and attach to a rotating plate 66 at another end. The grippers 62 move in/out (e.g., toward or away from) the track rail 15 by turning about a pivot 67. Moving the grippers 62 in or out enables the wheel assembly 48 to accommodate track rails 15 of various diameters and/or to adjust the friction between the wheels 56 and the track rail 15. For example, if the diameter of the track rail 15 is larger than shown, the grippers 62 may be moved outwardly, as shown by the arrows 68. However, to increase the friction between the wheels 56 and the track rail 15 the grippers 62 may be moved inwardly such that the wheels 56 'squeeze' the track rail 15 tighter. Increasing the friction between the wheels 56 and the track rail 15 when the support vehicle 22 is traveling along the track 14 may keep the support vehicle 22 from slipping off the track rail 15. Increasing the friction between the wheels 56 and the track rail 15 may also have an effect of slowing down or stopping the support vehicle 22, especially if the wheels 56 are prevented from spinning. In additional or alternative embodiments, the grippers 62 may be used by the support vehicle 22 to climb the track 14 (e.g., move along the track rail 15 without the wheels 56 spinning). To climb the track 14, the grippers 62 may be tightened to hold one set of the robotic legs 44 of the support vehicle 22 at one position on the track 14 while another set of robotic legs 44 may robotically move (e.g., step) to another position on the track 14. Repeating the process of tightening the grippers 62 and stepping with alternate sets of robotic legs 44 may enable the support vehicle 22 to achieve locomotion along the track 14 without the wheels 56 turning.

The wheel assembly 48 may rotate around the track rail 15 (e.g., about the axial axis 50) via rotation of the rotating plate 66 as shown by the arrow 70. Such rotation about the track rail 15 may enable the support vehicle 22 to stay on the track rail 15 even when operating upside down and/or from other perspectives. For example, the track 14 (e.g., roller coaster track) may have upside down portions or vertical loops. To block the support vehicle 22 from slipping off the track 14 in such scenarios, the wheel assembly 48 may be rotated about the track rail 15 to place one or more wheels 56 on top of the track rail 15.

Figure 6:
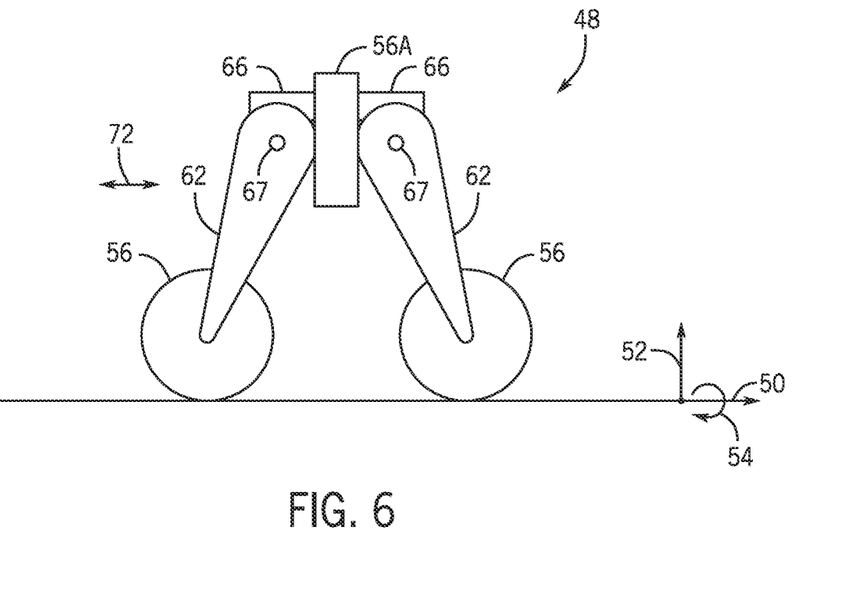
FIG. 6 is a schematic view of an embodiment of the wheel assembly of FIG. 5 positioned on a flat surface, in accordance with an aspect of the present disclosure.

In addition to enabling the support vehicle 22 to move along the track 14, the wheel assembly 48 may be configured to move the support vehicle 22 on a flat surface (e.g., relatively flat surface such as the ground), as shown in FIG. 6. FIG. 6 is a schematic diagram of a side view of an embodiment of the wheel assembly 48 of the support vehicle 22 of FIG. 1, where the wheel assembly 48 is positioned on a flat surface. In an embodiment, to enable the translational movement, shown by arrow, of the assembly on a surface, the middle wheel 56A (e.g., wheel positioned perpendicular to the two other wheels 56) may be lifted by rotating the gripper associated with the middle wheel out. Then, the wheel assembly 48 may roll on the other two wheels 56.

In an embodiment, the support vehicle 22 may be configured to autonomously approach the track 14 by rolling on a flat surface. In particular, the support vehicle 22 may travel to the track 14 from its parking location by rolling on the ground (e.g., paved path) and having the wheel assembly 48 in the configuration shown in FIG. 6. Once the support vehicle 22 has reached the track 14, it may autonomously mount the track 14 and traverse the track 14 performing reality capture, inspection, and/or maintenance operations as shown in a FIG. 7.

Figure 7:
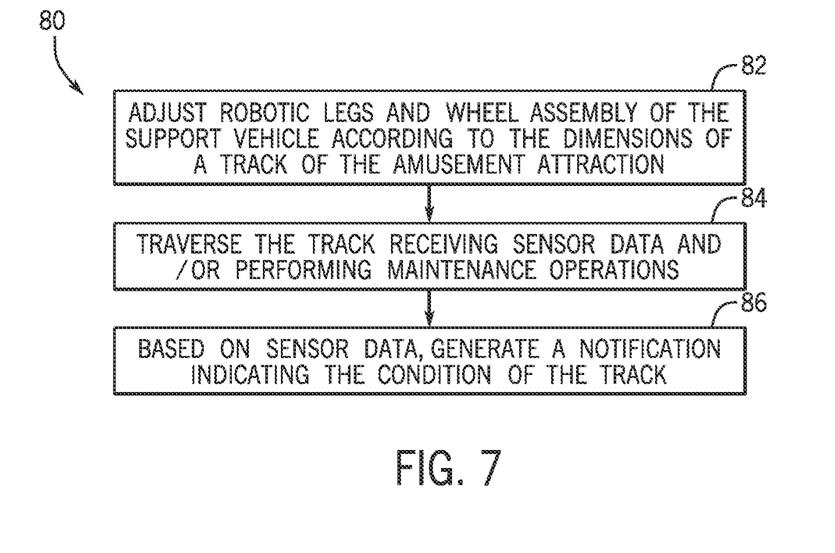
FIG. 7 is a flow diagram of an embodiment of a process of traversing a track via, for example, the support vehicle of FIG. 1, in accordance with an aspect of the present disclosure.

FIG. 7 is a flow diagram of a process 80 (or method) of traversing the track 14. It should be noted that reference numerals of structural features provided below are illustrated in various embodiments of FIGS. 1-6. The process 80 includes adjusting (block 82) the robotic legs 44 and the wheel assembly 48 of the support vehicle 22 according to the dimensions of the track 14 of the attraction system 12. The dimensions of the track 14 may include the diameter of the track rails 15, the number of track rails 15, the distance between the track rails 15, etc. The adjustment may involve robotic adjustment of the robotic legs 44 and/or the wheel assembly 48 via actuators 28 and/or motors 29. For example, the grippers 62 may be rotated in or out for the assembly to properly fit the track rail 15. Electronic, pneumatic, or hydraulic adjustment may be employed. In addition, the robotic legs 44 of the support vehicle 22 may be adjusted to create a proper distance between the wheel assemblies of different robotic legs 44 according to the distance between the track rails 15. The adjustment of the robotic legs 44 and the wheel assembly 48 may be performed autonomously, based on data input from an external controller that specifies the dimensions of the track 14 or based on dimensions on the track 14 as determined based on sensor data. In an embodiment, the support vehicle 22 may autonomously mount the track 14 by robotically moving the robotic legs 44 to 'step' onto the track 14 (e.g., from a platform).

In addition, the process 80 includes traversing (block 84) the track 14 while receiving sensor data and/or performing maintenance operations. As discussed, sensor data received by the support vehicle 22 may be collected via various sensors 24 (e.g., cameras, LIDAR sensors, vibration sensors, RFID scanners) onboard the support vehicle 22. Traversing the track 14 may involve moving at a constant speed, moving and stopping, or moving at variable speeds depending on the type of data collection that is being performed. For example, the support vehicle 22 may slow down when collecting one type of data (e.g., image data) and speed up when collecting another type of data (e.g. vibration data). In addition, the support vehicle 22 may stop on the track 14 to perform maintenance operations such as tightening fasteners on the track 14, removing debris from the track 14, or applying protective coating to the track 14.

In addition, the process 80 includes, based on sensor data generating (block 86) a notification indicating the condition of the track 14. In an embodiment, the collected sensor data may be analyzed onboard the support vehicle 22 via the vehicle controller 32. For example, a machine learning model may be utilized to identify presence of debris on the track 14 or misaligned torque strips based on image data. The notifications generated by the support vehicle 22 may include an indication that a problem with the track 14 was identified upon inspection (e.g., presence of debris, loose screw, and excess vibrations). In another example, the notification may indicate that a track maintenance operation has been successfully completed and that the track 14 is fit to be used for entertainment operations. In an embodiment, the notifications may trigger a response in the support vehicle 22. For example, a notification indicating that a loose bolt has been detected on a track 14 may trigger the support vehicle 22 to perform a maintenance operation of tightening the bolt. In an additional or an alternative embodiment, certain notifications may be sent to an external controller or a device. For example, a notification indicating that the track vibrations exceed a certain threshold may be sent, along with related sensor data, to the operator or the servicer of the attraction system 12 for analysis.

The present disclosure includes various systems and methods that enable various technical benefits over traditional approaches. For example, disclosed embodiments relate to amusement attraction inspection, monitoring, and/or maintenance that is less time consuming, less expensive, less complex, and less burdensome than traditional approaches.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system, comprising:
   a track comprising a rail;
   a support vehicle having a wheel assembly configured to adjustably engage the track, and having a sensor configured to acquire sensor data indicative of a characteristic of the attraction system; and
   a vehicle controller configured to:
   determine a cross-sectional dimension of the rail;
   control the wheel assembly to engage the support vehicle with the rail based on the cross-sectional dimension of the rail;
   control the support vehicle to traverse the track via the wheel assembly;
   receive, from the sensor, the sensor data indicative of the characteristic of the attraction system; and
   instruct performance of an action based on the sensor data.

2. The attraction system of claim 1, comprising an additional track having an additional rail, wherein the vehicle controller is configured to:
   determine an additional cross-sectional dimension of the additional rail, the additional cross-sectional dimension being different than the cross-sectional dimension of the rail;
   control the wheel assembly to engage the support vehicle with the additional rail based on the additional cross-sectional dimension of the additional rail; and
   control the support vehicle to traverse the additional track via the wheel assembly.

3. The attraction system of claim 1, wherein the support vehicle comprises a robotic leg assembly, and a robotic leg of the robotic leg assembly is coupled to the wheel assembly.

4. The attraction system of claim 3, wherein the vehicle controller is configured to control a robotic leg configuration of the robotic leg assembly such that the robotic leg configuration corresponds to a track configuration of the track.

5. The attraction system of claim 1, wherein the wheel assembly comprises:
   a wheel;
   a pivot; and
   a gripper configured to rotate about the pivot to move the wheel closer to or further away from the rail, wherein the vehicle controller is configured to control the gripper via the pivot to engage the support vehicle with the rail based on the cross-sectional dimension of the rail.

6. The attraction system of claim 5, wherein the wheel assembly comprises:
   an additional wheel;
   an additional pivot; and
   an additional gripper configured to rotate about the additional pivot to move the additional wheel closer to or further away from the rail, wherein the vehicle controller is configured to control the additional gripper via the additional pivot to engage the support vehicle with the rail based on the cross-sectional dimension of the rail such that a spacing between the wheel and the additional wheel corresponds to the cross-sectional dimension of the rail.

7. The attraction system of claim 1, wherein the cross-sectional dimension of the rail comprises a diameter of the rail.

8. The attraction system of claim 1, wherein the sensor comprises a light detection and ranging (LIDAR) sensor, a radio-frequency identification (RFID) scanner, or a combination thereof.

9. The attraction system of claim 1, wherein the support vehicle comprises:
a robotic arm configured to operate a tool, wherein the tool comprises at least a socket, a wrench, or an application brush; and
an actuator configured to be controlled by the vehicle controller to drive movement of the robotic arm.

10. The attraction system of claim 1, comprising a ride vehicle separate from the support vehicle and configured to carry passengers of the attraction system, wherein the support vehicle comprises a first weight, the ride vehicle comprises a second weight, and the first weight is less than the second weight.

11. The attraction system of claim 1, wherein the support vehicle is an autonomous support vehicle.

12. An autonomous support vehicle comprising:
a robotic leg assembly coupled to a wheel assembly, wherein the wheel assembly is configured to roll on a track of an attraction system;
a robotic arm configured to receive an additional component of the autonomous support vehicle;
a modular payload platform coupled to the robotic arm; and
a vehicle controller configured to:
determine at least one size characteristic of the track;
control, based on the at least one size characteristic of the track, the robotic leg assembly to move the wheel assembly toward the track;
determine a cross-sectional dimension of a rail of the track;
control, based on the cross-sectional dimension of the rail, the wheel assembly to engage the autonomous support vehicle with the rail;
control the robotic arm to cause a movement of the additional component relative to the modular payload platform; and
control the autonomous support vehicle to traverse the track.

13. The autonomous support vehicle of claim 12, wherein the vehicle controller is configured to control the robotic leg assembly, the wheel assembly, or both to switch between a first configuration and a second configuration, wherein the first configuration enables the wheel assembly to roll on the track and the second configuration enables the wheel assembly to roll on a relatively flat surface separate from the track.

14. The autonomous support vehicle of claim 12, wherein the vehicle controller is configured to:
receive image data from a camera; and
based on the image data, control the robotic arm to perform a maintenance operation on the track via the additional component.

15. The autonomous support vehicle of claim 14, wherein the vehicle controller is configured to generate, based on the image data, a notification indicating a condition of the track.

16. The autonomous support vehicle of claim 12, wherein the cross-sectional dimension of the rail comprises a diameter of the rail.

17. A method comprising:
adjusting, based on a spacing between a first rail of a track and a second rail of the track, a robotic leg assembly of an autonomous support vehicle such that a configuration of a wheel assembly coupled to the robotic leg assembly corresponds to the spacing;
adjusting, based on a first cross-sectional dimension of the first rail, a second cross-sectional dimension of the second rail, or both, the wheel assembly to engage the autonomous support vehicle with the first rail, the second rail, or both;
traversing the track via the autonomous support vehicle;
receiving sensor data via a sensor of the autonomous support vehicle; and
based on the sensor data, controlling a robotic arm to perform a maintenance operation.

18. The method of claim 17, comprising:
generating, based on the sensor data, a notification indicating a condition of the track; and
sending the notification to an external controller, a mobile device, or both.

19. The method of claim 17, comprising:
traversing, via the autonomous support vehicle, a flat surface of an amusement park environment toward the track; and
robotically mounting the track via the autonomous support vehicle.

20. The method of claim 17, comprising:
controlling, based on the first cross-sectional dimension or the second cross-sectional dimension, a gripper of the wheel assembly to engage the autonomous support vehicle with the first rail or the second rail.

* * * * *